United States Patent [19]
Jones
[11] 3,855,538
[45] Dec. 17, 1974

[54] MEANS AND METHOD FOR PROVIDING HIGHLY STABLE REFERENCE

[75] Inventor: John M. Jones, Houston, Tex.
[73] Assignee: Texaco Inc., New York, N.Y.

[22] Filed: Feb. 16, 1973
[21] Appl. No.: 333,074

[52] U.S. Cl. .................. 328/175, 307/264, 307/268, 328/53, 328/146, 328/168
[51] Int. Cl. ........................... H03b 3/02, H03k 5/00
[58] Field of Search ....... 328/44, 53, 115, 168, 172, 328/173, 175, 146; 307/264, 268

[56] References Cited
UNITED STATES PATENTS

| | | | |
|---|---|---|---|
| 2,700,750 | 1/1955 | Dickinson | 328/44 X |
| 2,816,226 | 12/1957 | Forrest et al. | 328/44 |
| 3,654,562 | 4/1972 | Reilly, Jr. et al. | 328/115 X |

*Primary Examiner*—John Zazworsky
*Attorney, Agent, or Firm*—Thomas H. Whaley; C. G. Ries

[57] ABSTRACT

The apparatus and method provide reference pulses for use with a well logging system in which each reference pulse is generated downhole and is compared with a reference voltage downhole. When the amplitude of a reference pulse is less than the reference voltage, the next reference pulse has its amplitude increased. The process continues until such time as the amplitude of a current reference pulse exceeds the reference voltage. The next subsequent reference pulse has the same amplitude as the next previous reference pulse. Thus the amplitudes of the reference pulses will be substantially the same as the amplitude of the reference voltage.

8 Claims, 1 Drawing Figure

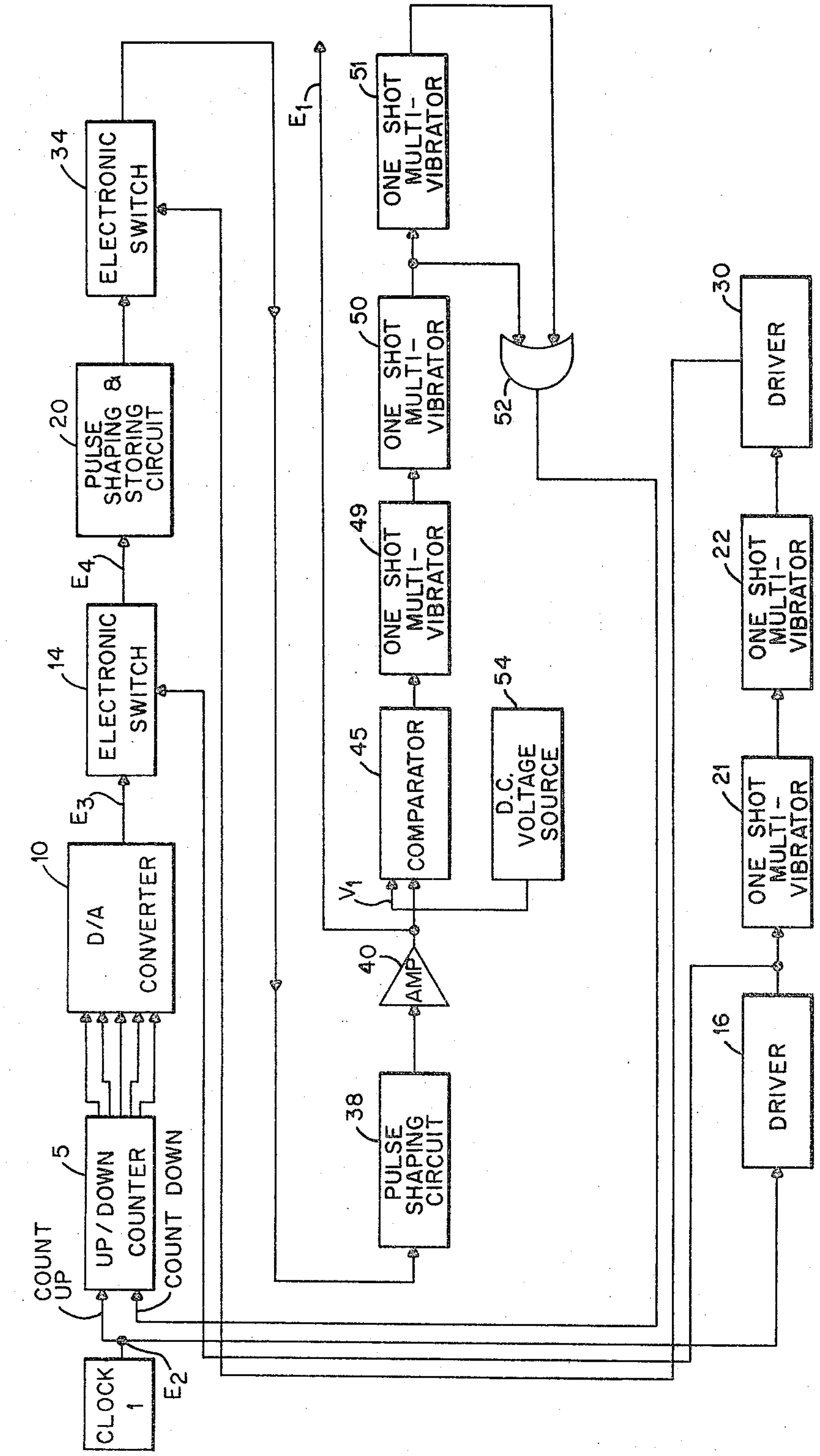
CLOCK 1
E2
COUNT UP
COUNT DOWN
UP/DOWN COUNTER
5
D/A CONVERTER
10
E3
ELECTRONIC SWITCH
14
E4
PULSE SHAPING & STORING CIRCUIT
20
ELECTRONIC SWITCH
34
PULSE SHAPING CIRCUIT
38
AMP
40
V1
COMPARATOR
45
D.C. VOLTAGE SOURCE
54
ONE SHOT MULTI-VIBRATOR
49
ONE SHOT MULTI-VIBRATOR
50
ONE SHOT MULTI-VIBRATOR
51
E1
52
DRIVER
16
ONE SHOT MULTI-VIBRATOR
21
ONE SHOT MULTI-VIBRATOR
22
DRIVER
30

MEANS AND METHOD FOR PROVIDING HIGHLY STABLE REFERENCE

BACKGROUND OF THE INVENTION

1. Field of the Invention

The present invention relates to pulse generators and pulse generating methods in general and, more particularly, to a suitable network and method for providing reference pulses to be used downhole in a well logging system.

2. Description of the Prior Art

Heretofore, apparatus such as disclosed in U.S. application Ser. No. 192,883, used an electromechanical device such as a relay in providing reference pulses downhole in a well logging tool. Electromechanical devices as such have a finite life and are bulkier than solid state electronic devices.

The present invention provides a solid state network, which is suitable for being used downhole in a borehole, for providing reference pulses.

SUMMARY OF THE INVENTION

A reference pulse network includes a clock providing clock pulses. The network further includes a circuit changing the amplitude of a reference pulse, provided by the network, by a predetermined amount in response to a clock pulse. A source provides a reference voltage. The amplitude of a next subsequent reference pulse provided by the network is controlled in a manner so that the next subsequent reference pulse amplitude is changed in one direction when the current reference pulse amplitude does not exceed the reference voltage amplitude and is changed in an opposite direction when the current reference pulse amplitude does exceed the reference voltage amplitude.

The objects and advantages of the invention will appear more fully hereinafter, from a consideration of the detailed description which follows, taken together with the accompanying drawing wherein one embodiment is illustrated by way of example. It is to be expressly understood, however, that the drawing is for illustrative purposes only and is not to be construed as defining the limits of the invention.

DESCRIPTION OF THE DRAWING

The FIGURE shows a simplified block diagram of apparatus, constructed in accordance with the present invention, for providing reference pulses.

DESCRIPTION OF THE INVENTION

Referring to the FIGURE, there is shown a network for providing a reference pulse $E_1$ for use with a well logging system. Such a well logging system is described and disclosed in U.S. application Ser. No. 192,883 filed on Oct. 10, 1971. In the referenced application, the network shown in the FIGURE would replace elements 14, 16, 15 and 17.

A clock 1 provides clock pulses $E_2$ to a count up input of a conventional up-down counter 5. Counter 5 counts up the pulses $E_2$. Counter 5 provides a plurality of digital outputs, corresponding to the count, to a digital-to-analog converter 10, which may be of a conventional type. Converter 10 provides an analog signal $E_3$ corresponding to the count in counter 5.

Signal $E_3$ is applied to an electronic switch 14 which is rendered conductive by an amplified $E_2$ pulse provided by a driver 16 and which is rendered non-conductive by the absence of a pulse from driver 16. Switch 14, when rendered conductive passes signal $E_3$ to a pulse shaping and storing circuit 20. Since switch 14 is rendered conductive for a finite time period, the passed $E_3$ signal appears as a pulse $E_4$.

Circuit 20 shapes and stores the $E_4$ pulse. The amplified $E_2$ pulse from driver 16 triggers a one-shot multivibrator 21 which after a suitable time delay triggers another one-shot multivibrator 22. The pulse provided by one-shot 22 is amplified by a driver 30 and provided to an electronic switch 34.

Switch 34 is rendered conductive by an amplified pulse from driver 30 and non-conductive by the absence of a pulse from driver 30. Due to the time delay of oneshot 21, switch 34 is rendered conductive, to pass pulse $E_4$ from circuit 20 to a pulse shaping circuit 38.

An amplifier 40 amplifies the shaped pulse from circuit 38 to provide pulse $E_1$.

Pulse $E_1$ is maintained substantially at a predetermined value by clock 1, counter 5, a comparator, one-shot multivibrators 49, 50 and 51 and an OR gate 52. Each pulse $E_2$ from clock 1 applied to the up input of counter 5 increases the amplitude of signal $E_3$ and hence the amplitude of pulse $E_1$. Pulse $E_1$ is continually compared with a direct current voltage $V_1$ from a source 54 by comparator 45. Voltage $V_1$ corresponds to a reference amplitude for pulse $E_1$.

When the increase in the amplitude of pulse $E_1$ due to a pulse $E_2$ does not cause pulse $E_1$ amplitude to exceed the reference amplitude of voltage $V_1$, the next pulse $E_1$ is allowed to increase its amplitude. However, when the increase in the amplitude of pulse $E_1$ causes pulse $E_1$ amplitude to exceed the reference amplitude, the next pulse $E_1$ amplitude is restored to the value preceding the increase.

For the first condition mentioned in the preceding paragraph, that is pulse $E_1$ is equal to or less than voltage $V_1$, comparator 45 provides a high level direct current output to one-shot 45 which is unaffected at this point by comparator 45 output. Thus the next pulse $E_2$ will again increase the amplitude of pulse $E_1$.

When pulse $E_1$ exceeds voltage $V_1$, the output from comparator 45 goes to a low level triggering oneshot 45. One-shot 45 acts as a time delay. It is not necessary to have such time delay but it is desirable. The trailing edge of the pulse from one-shot 49 triggers one-shot 50 which provides a pulse to a 'count down' input of counter 5 through OR gate 52. Counter 5 counts down the pulse from one-shot 50 to effectively restore the count that was in counter 5 prior to the counting of the last pulse $E_2$.

The trailing edge of the pulse from one-shot 50 triggers one-shot 51. The resulting pulse from oneshot 51 passes through OR gate 52 and is counted down by counter 5 thus decreasing the count that was in counter 5 by one. Since the count is reduced by one and since signal $E_3$ is not passed by switch 14 until the next pulse $E_2$, the next pulse $E_2$ increases the count by one and effectively restores the original count. The next $E_1$ pulse will have an amplitude that does not exceed the reference value. Thus pulses $E_1$ will increase in amplitude until they substantially achieve the reference amplitude. Operation of the network shown in FIG. 1 is initiated by applying power to the appropriate circuits and elements, such application of power is not being shown for convenience.

The method and network as heretofore described periodically provides a pulse of a substantially stable amplitude for use in a well logging system.

What is claimed is:

1. A network for providing reference pulses comprising means for providing a pulse train, clock means for providing clock pulses at a predetermined frequency, means connecting the clock means to the pulse train means for changing the amplitude of a pulse in the pulse train by a predetermined amount in response to a clock pulse from the clock means, means for providing a reference voltage, means connected to the pulse train means, to the reference voltage means and to the changing means for controlling the amplitude of a next subsequent pulse in the pulse train in a manner so that the next subsequent pulse amplitude is changed by the predetermined amount in one direction when the amplitude of a current pulse in the pulse train does not exceed the reference voltage and the next subsequent pulse amplitude is changed in an opposite direction by the predetermined amount when the current pulse amplitude exceeds the reference voltage so that the amplitude of the pulses in the pulse train are maintained at a substantially constant level, and means connected to the pulse train means for providing the pulses of the pulse train as the reference pulse.

2. A network as described in claim 1 in which the changing means include a bi-directional counter having a pair of inputs, the counter counts pulses arriving at one input in one direction and pulses arriving at the other input in an opposite direction, with the one input being connected to the clock means and the other input being connected to the control means and said counter providing a plurality of digital signals corresponding to the count, and means connected to the counter for providing an analog signal corresponding to the count in accordance with the digital signals.

3. A system as described in claim 2 in which the pulse train means includes first switching means connected to the analog signal means and to the clock means for passing the analog signal in response to a clock pulse and blocking the analog signal during the absence of a clock pulse so as to provide a pulse whose amplitude corresponds to the count in the counter, means connected to the first switching means for shaping and holding the pulse provided by the first switching means, means connected to the clock means for providing a control pulse at some predetermined time after the occurrence of a clock pulse, second switching means connected to the pulse shaping and holding means and to the control pulse means for passing the held shaped pulse in response to a control pulse and for blocking the held shaped pulse during the absence of a control pulse, and circuit means connected to the second switching means for affecting the pulse from the second switching means to provide a reference pulse.

4. A network as described in claim 3 in which the control means includes means connected to the circuit means and to the reference voltage means for comparing each pulse in the pulse train with the reference voltage and providing a signal corresponding to the comparison, and means connected to the other input of the counter and controlled by the signal from the comparing means for providing two pulses to the other input of the counter when the amplitude of a pulse in the pulse train exceeds the amplitude of the reference voltage and for not providing any pulses when the amplitude of a pulse in the pulse train does not exceed the amplitude of the reference voltage.

5. A method for providing reference pulses comprising providing a pulse train, providing clock pulses at a predetermined frequency, changing the amplitude of a pulse in the pulse train by a predetermined amount in response to a clock pulse, providing a reference voltage, controlling the amplitude of a next subsequent pulse in the pulse train in a manner so that the amplitude of the next subsequent pulse in the pulse train is changed by the predetermined amount in one direction when a current pulse in the pulse train does not exceed the reference voltage and the amplitude of the next subsequent pulse in the pulse train is changed in an opposite direction by the predetermined amount when the amplitude of the pulse in the pulse train exceeds the reference voltage, and providing the pulses of the pulse train as the reference pulses.

6. A method as described in claim 5 in which the control step includes providing two pulses when the current pulse amplitude exceeds the reference voltage amplitude and providing no pulses when the current pulse amplitude does not exceed the reference voltage; and the changing step includes counting the clock pulses in one direction and the two pulses in an opposite direction, providing a plurality of digital signals corresponding to the count, and converting the digital signals to an analog signal.

7. A method as described in claim 6 in which the pulse train step includes providing a pulse whose amplitude corresponds to the count in the counter, shaping and holding the last mentioned pulse provided, providing a control pulse at some predetermined time after the occurrence of a clock pulse, passing the held shaped pulse in response to a control pulse and blocking the held shaped pulse during the absence of a control pulse, affecting the pulse passed during the second mentioned passing to provide a pulse, and repeating the steps so as to provide the pulse train.

8. A network as described in claim 7 in which the control step includes comparing each pulse in the pulse train with the reference voltage, providing a signal corresponding to the comparison, providing the two pulses for counting when the amplitude of a pulse in the pulse train exceeds the amplitude of the reference voltage and not providing any pulse when the amplitude of a pulse in the pulse train does not exceed the amplitude of the reference voltage.

* * * * *